United States Patent Office 3,652,685
Patented Mar. 28, 1972

3,652,685
PROCESS FOR CATALYST REMOVAL FROM
REACTION MASS
James C. Geddes, Jr., Orangeburg, S.C., assignor to
Ethyl Corporation, New York, N.Y.
No Drawing. Continuation-in-part of application Ser. No.
188,939, Apr. 20, 1962. This application Feb. 27, 1969,
Ser. No. 804,373
Int. Cl. C07c 39/06
U.S. Cl. 260—624 C          7 Claims

ABSTRACT OF THE DISCLOSURE

A process for removal of aluminum alcoholate catalyst from reaction mass produced in ortho-alkylation of phenolic compounds which comprises adding thereto, preferably, from about 3 to about 6 mols of water per mol of aluminum-containing catalyst in the reaction mass. Process applicable to orthoalkylation of mono- or poly-nuclear and mono- or poly-hydroxy phenolic compounds and may or may not have other substituents on the ring. Addition of water is critical to efficient removal of catalyst from reaction mass.

---

This application is a continuation-in-part of co-pending application Ser. No. 188,939, filed Apr. 20, 1962, now abandoned.

This invention relates to the art of ortho-alkylation of phenolic-type compounds, and more particularly, it relates to the separation of catalyst from reaction masses resulting from ortho-alkylation of phenolic-type compounds.

Phenolic-type compounds having an open ortho position in the molecule may be alkylated with olefins to give predominantly ortho-alkylated products when aluminum phenoxides or other aluminum compounds are used as catalysts. An important process of this type, for example, involves the ortho-alkylation of phenol with isobutylene in the presence of an aluminum triphenoxide catalyst. Another important process is the ortho-alkylation of aniline with ethylene using an aluminum anilide catalyst.

A problem of considerable proportions in connection with these and other such processes is one concerning the separation of the catalyst from a reaction mass which results as an intermediate in the ortho-alkylation process. Catalyst concentration is an important reaction variable in these ortho-alkylation processes, and the catalyst must be used in substantially large amounts to provide a satisfactory reaction rate. This means that a considerable amount of catalyst will be contained within the reaction mass, and since the catalyst will also act as dealkylation or redistribution catalysts under different reaction conditions, it must be removed substantially completely prior to separation of the ortho-alkylation products by distillation to prevent decomposition and rearrangement of the products. Further, in many of the reactions, relatively large amounts of the desired reaction product may be combined with the catalyst, and for obvious economic reasons, this desired reaction product should be recovered.

While catalyst removal by washing with aqueous solutions is not without problems, the catalyst may be removed by the addition of large volumes of water to a reaction mass and then filtration to remove the gelatinous aluminum hydroxide precipitate that is formed. This procedure for removing the catalyst, however, is burdensome in that filtration rate, among other things, is very slow. Acidified water may be added to a reaction mass causing two liquid phases, an organic liquid phase and an aqueous phase, to be formed; and generally this is a less burdensome method of separation; however, the use of an acidified aqueous solution in treating the phenol-isobutylene reaction mass, for example, produces an aqueous phenol-containing stream which presents an acute waste disposal problem. As is well known, phenol is a toxic material and before an aqueous solution containing the phenol may be ditched for disposal, the phenol must be removed substantially completely from the aqueous waste stream. In fact, concentrations of phenol in a waste aqueous solution generally cannot exceed 5 parts per billion parts of aqueous solution, and acidified aqueous treatment as described above produces aqueous streams having phenol concentrations considerably in excess of this.

A normal procedure for effecting the removal of the phenol and phenol-type compounds from aqueous solutions is by "burning" or passing the aqueous solution into contact with an open flame which flame volatilizes the aqueous solution and burns out the phenol, phenol-type compounds and other combustible organic contaminants; however, this method of disposing of phenolic-type wastes is obviously quite burdensome.

An object of this invention is to provide a new and improved process for the removal of aluminum catalyst from an ortho-alkylation reaction mass which avoids the foregoing and other difficulties associated with disposal of phenolic-type wastes. It is also an object of this invention to provide a process for the speedy and economical removal of aluminum catalysts from an ortho-alkylation mass without the formation of large volumes of aqueous solutions containing phenol-type compounds which would normally present a waste disposal problem. A further object of this invention is to provide a process for recovering a desired product from an ortho-alkylation reaction mass substantially completely. A still further object of this invention is to provide a process for separating an orthoalkylation reaction mass into only a solid phase and a liquid organic phase which may be separated in a simple manner. These and other objects will be apparent from the following description of the invention.

In a process for the manufacture of ortho-alkylated phenolic-type compounds by reaction between a phenolic-type compound and an olefin containing from two to eight carbon atoms in the presence of an aluminum-containing catalyst, this invention teaches removing the aluminum-containing catalyst from the resulting reaction mass as a solid phase by a process comprising, in combination, (a) contacting said resulting reaction mass with sufficient mols of water to form only said solid phase and an ortho-alkylated phenolic-type compound containing liquid organic phase, and
(b) recovering said liquid organic phase from said solid phase.

A more preferred embodiment of the process of this invention is the process described above further characterized by said sufficient mols of water being up to about six mols of water per mol of aluminum-containing catalyst in said reaction mass.

An even more preferred embodiment of the process of this invention is the process described above further characterized by said sufficient mols of water being from about 3 mols to about 6 mols of water per mol of aluminum-containing catalyst in said reaction mass.

The reaction mass which may be treated in accordance with the process of this invention is one which results from ortho-alkylation processes such as are described, for example, in U.S. Letters Patents 2,248,827; 2,831,898, and 2,923,745 as well as those masses resultant from other ortho-alkylation processes well known in the art.

The phenolic-type compound to be ortho-alkylated may be mono or poly-nuclear and monopolyhydroxide and may or may not have other substituents on the ring or the hydroxy group of the phenol may be replaced by an amine group. A requirement for the phenolic-type compound is that it should have a position ortho to the hydroxy group, or an amine group replacing the hydroxy group, available for substitution. Non-limiting examples of such phenolic-type compounds are phenol, aniline, o-cresol, m-cresol, p-cresol, o-chlorophenol, m-chlorophenol, p-chlorophenol, 2,5-dichlorophenol, p-bromophenol, o-nitrophenol, m-nitrophenol, p-nitrophenol, o-cyclohexylphenol, p-cyclohexylphenol, catechol, resorcinol, hydroquinone, pyrogallol, hydroxyhydroquinone, phloroglucinol, o-aminophenol, m-aminophenol, p-aminophenol, guaiacol, anol, eugenol, isoeugenol, saligenin, carvacrol, thymol, o-hydroxyacetophenone, p-hydroxyacetophenone, o-hydroxydiphenyl, p-hydroxydiphenyl, m-hydroxyethylbenzoate, p-hydroxymethylbenzoate, naphthol-1, 3-chloronaphthol-1, 6-bromonaphthol-1, 3-nitronaphthol-1, 3-methylnaphthol-1, 8 - aminonaphthol - 1, anthrol - 1, 9 - chloroanthrol-1, 3-bromoanthrol-1, 9-aminoanthrol-1, phenanthrol, ar-2-tetraol, and the like.

The unsaturated compounds that can be used to introduce organic groups onto the aromatic nucleus are acetylene and substituted acetylenes such as methyl acetylene, ethyl acetylene, and the like; mono- and non-conjugated olefins such as ethylene, propylene, butylene, isobutylene, amylene, isoamylene, 2 - methylamylene, hexene, heptene, heptadienes, octene, diisobutylene, and others. In addition, mixed olefins obtained by polymerizing ethylenes, propylenes and others by well known methods, as well as certain substituted olefins such as vinyl chloride and vinyl ethyl ether, may be used individually or as mixtures when said mixtures comprise substantially only olefins having from about 2 to about 8 carbon atoms.

The present invention comprises the addition of small and critical amounts of water to a reaction mass resulting from an ortho-alkylation reaction, in the presence of an aluminum-containing catalyst, of a phenolic-type compound having an available ortho position and an olefin, each as described above. Upon the addition of the critical amount of water to a resulting reaction mass, two separate and distinct phases are formed—a solid phase and a liquid organic phase. The reaction mass, prior to treatment in accordance with this invention may comprise unreacted phenolic-type compound, olefin, aluminum-containing catalyst, alkylated aluminum compounds and ortho-alkylated products. For example, a preferred reaction mass for treatment in accordance with the process of this invention is one resulting from a phenol-isobutylene reaction in the presence of an aluminum phenoxide catalyst. Upon the addition of small and critical amounts of water to such a phenolisobutylene reaction mass, which comprises unreacted phenol, isobutylene, aluminum phenoxide, butylated aluminum phenoxide and ortho-alkylation products consisting essentially of orthotertiary butyl phenol, 2,6-di-tertiary butyl phenol and 2,4,6-tertiary butyl phenol, only a solid phase and a liquid organic phase is formed. It is clear, however, that if more than the small and critical amounts of water are added to such a reaction mass two liquid phases, an organic phase and an aqueous phase are obtained; however, by treatment in accordance with the process of this invention only two phases, a solid phase and an organic liquid phase, result. In accordance with the process of this invention, the reaction mass is contacted with up to about 6 mols of water per mol of aluminum-containing catalyst contained within a reaction mass. Using this quantity of water a solid phase is formed within an organic liquid phase and no separate aqueous phase results.

While the precise chemistry is not known and applicants do not intend to be bound by any mechanism, it is believed that the addition of the small and critical quantities of water causes the formation of certain forms of hydrated aluminum hydroxides from the aluminum-containing catalyst or aluminum compounds of reaction products or both and these hydroxide compounds become the solid phase formed by the addition of water to the reaction mass.

The solids of a resulting slurry of a solid phase and organic liquid phase may be separated from an organic phase by any of the conventional techniques well known in the art used for such separations such as by filtration, centrifuging, and the like. When a resulting slurry is filtered, the solids remain behind on the filter medium and the organic phase passes through the filter. The organic phase containing the orthoalkylation products is obtained substantially completely free of catalyst and can then be distilled to recover the desired ortho-alkylated phenol-type compound or compounds. When an aluminum-containing catalyst is removed in this manner, no significant rearrangement or change in product distribution results during the removal or subsequent product treatment. Though it is preferred to remove the hydrated aluminum hydroxides substantially completely from the reaction mass prior to distillation, desired ortho-alkylated products may be recovered directly without first removing the solids, as by direct distillation of the water treated reaction mass. This is possible because the catalytic activity of the aluminum-containing catalyst is destroyed substantially completely by the addition of the water and hence cannot cause redistribution of the products.

While as little as 1 mol of water per mol of alumina-containing catalyst may be used pursuant to this invention, the filtration rate for the separation of the solid and liquid phases may be quite slow without the use of filter aids at this low water ratio. In a preferred embodiment, from about 3 mols to about 6 mols of water per mol of aluminum-containing catalyst within the reaction mass may be employed. This permits more rapid filtration and assures virtually complete removal of catalyst from the reaction mass. At about 6 mols of water per mol of aluminum-containing catalyst within the reaction mass, it has been found that exceptionally clean separation and fast filtering is obtained. Generally, any filtration of the organic phase from the solid phase after addition of the water is conducted at a temperature ranging from about 90° C. to about 160° C. to provide more rapid filtering.

A feature of this invention resides in the unique advantage that the olefin itself provides for a more rapid, efficient and clean separation of the solids from the organic liquid layer than would occur without its presence in significant quantity. Thus, it has been found that when the reaction mass contains an olefin such as isobutylene, preferably from about 5 weight percent to about 60 weight percent, based on the total weight of the reaction mass, an extremely rapid and clean separation of the solids and liquid layer is obtained, and a particularly preferred olefin concentration range is from about 10 percent to about 45 percent. An olefin, such as isobutylene, may be contained within the reaction mass in sufficient quantity as unreacted material from the original reaction, or if an insufficient amount is present, additional quantities of the same or different olefinic material may be added to the reaction mass prior to filtration. Generally, additional quantities of olefin or other material must be added because most of the material present as a reactant originally has been utilized in the reaction.

Pursuant to a preferred embodiment of this invention there is provided a combination of conditions which not only accomplish essentially complete catalyst removal from the olefin-phenolic-type compound reaction mass but also provide the ideal and rapid filtering conditions. This combination of steps comprises adding sufficient olefin, such as isobutylene, to a reaction mass to form an olefin concentration ranging from about 10 to about 45 weight percent, based on the total weight of the reaction mass; then contacting the reaction mass with approximately 6 mols of water per mol of aluminum-containing catalyst contained within the reaction mass; and then filtering the resulting two phase, solid and organic liquid slurry at a temperature of from about 90° C. to about 160° C. while applying a positive pressure up to about 250 pounds per square inch gauge upon the slurry to separate the solids from the liquid phase. The liquid phase, after passage through the filter, is substantially completely free of catalyst.

The following non-limiting examples are illustrative.

EXAMPLE I

A crude reaction mass from an isobutylene-phenol reaction containing an aluminum phenoxide catalyst was treated in a vessel with a sufficient quantity of isobutylene to form a mixture of 42 percent isobutylene and 58 percent butylated phenols.

Water was then added to this reaction mass mixture in a quantity sufficient to provide 6 mols of water for each mol of aluminum phenoxide catalyst present in the reaction mixture, and the resulting mixture was agitated for a period of approximately 15 minutes to assure complete mixing. A slurry consisting of solids suspended within an organic liquid medium was formed.

The slurry, at a temperature of 140° C., was then filtered under a pressure of 210 pounds per square inch gauge to force the liquids through the filter medium. On the down stream side of the filter medium, isobutylene was flashed and the organic liquids were removed and distilled to recover the ortho-alkylated products.

It was found that the aluminum phenoxide catalyst was removed completely from the reaction mass and the rate of filtration was extremely high.

When a run as above was repeated in all details except that the treated reaction mass was centrifuged, an even faster recovery of the desirable products was obtained.

EXAMPLE II

A reaction mass was charged to a vessel provided with agitating means and treated with sufficient isobutylene to form a 60 percent, by weight, isobutylene concentration with the balance of the solution being essentially butylated phenols and catalyst. Water was then added to the vessel in a concentration sufficient to provide 3 mols of water per mol of aluminum phenoxide catalyst and solids were formed within the liquid organic phase. Kieselguhr was added to the slurry which was then agitated for a period of 10 minutes at a temperature of 100° C., and passed through a filter. A pressure of 210 pounds per square inch gauge was applied upon the two phase system and the liquids were forced through the filter medium. The filtered organic phase was recovered, the isobutylene flashed therefrom, and the remaining organic liquid distilled for desired product recovery.

It is found that substantially all of the catalyst was removed from the organic liquid phase and the filtering was accomplished at a rapid rate.

EXAMPLE III

When Example II was repeated in all details except that 1 mol of water per mol of aluminum phenoxide catalyst was provided, an adequate filtering rate was achieved, and essentially all of the catalyst was removed as solid from the organic liquid phase.

EXAMPLE IV

When Example I was repeated in all details except that 15 volume percent of toluene, based on the total volume of the reaction mass, was added to the reaction mass in lieu of isobutylene, all of the aluminum phenoxide catalyst was removed from the reaction mass and filtering, at 125° C., was accomplished at a satisfactory rate. The toluene was removed from the liquid organic phase by distillation prior to the separation by distillation of the butylated phenols.

EXAMPLE V

A reaction mass from an ortho-cresol-propylene reaction was treated in a reaction vessel with 6 mols of water per mol of aluminum triphenoxide catalyst and the resulting slurry containing a considerable quanity of 6-isopropyl-ortho-cresol was charged at 140° C. to a filtering apparatus. A pressure of 220 pounds per square inch gauge was applied to the slurry to force the liquids through the filter screen.

A very satisfactory rate of filtration was obtained and the catalyst was removed substantially completely from the organic phase. Upon distillation of the filtered organic phase, no significant amount of redistribution of the product was found to occur.

EXAMPLE VI

A reaction mass from a phenol-styrene ortho-alkylation reaction containing a considerable quantity of aluminum triphenoxide catalyst was treated with water in a reaction vessel equipped with agitation means. Sufficient water was added to provide 5 mols of water per mol of aluminum triphenoxide catalyst.

When the resulting slurry was filtered at 130° C. with a 210 pound per square inch gauge pressure applied upon the slurry, a fast rate of filtration was obtained, and substantially all of the catalyst was removed from the slurry by the filter. Upon distillation of the filtered product, no significant amount of redistribution of the product was obtained.

EXAMPLE VII

A charge of 6 pound mols of phenol, 0.363 pound mol of aluminum flake, 11 pound mols of propylene was placed in an autoclave and heated under pressure to perform the ortho-alkylation reaction. At the end of the alkylation, the resulting reaction mass was cooled to 50° C. and mixed thoroughly with 1.44 pound mols of water which corresponded to 4 mols of water per mol of aluminum. The resulting reaction mass slurry consisting of only solids and organic liquid was distilled recovering phenol and ortho-isopropyl phenolics in good yield and the bottom material after distillation was a solid.

EXAMPLE VIII

Twelve pound mols of phenol, 0.678 pound mol of aluminum flake, and 19.0 pound mols of butene-2 were charged to an autoclave and heated under pressure for the ortho-alkylation reaction. At the completion of the reaction, the resulting mass was cooled to 50° C. and 2.22 pound mols of water added thereto which corresponded to 3.28 mols of water per mol of aluminum. The resulting slurry of only organic liquid and solids was distilled recovering phenol and the ortho-sec-butyl phenol in good yield leaving only a solid as bottoms after distillation, and no water was in the distillation overhead.

EXAMPLE IX

A 1184 ml. autoclave was flushed with nitrogen and charged with 6 mols of reagent grade aniline and 0.345 mol of aluminum flake. The autoclave was sealed and heated, and the reaction started at 261° C. and raised the pressure to 588 p.s.i.g. in three minutes. After cooling to 80° C., the pressure in the autoclave was vented and an additional 0.345 mol of aluminum flake was added and the autoclave resealed and heated again. Reaction started at 200° C. and the reaction pressure reached 520 p.s.i. at 277° C.

The resulting reaction mixture was cooled to room temperature, the pressure vented to atmospheric, and 3.6 mols of ethylene were added over a 6 hour and 25 minute period at a temperature of 340 to 344° C. and a pressure of 350 p.s.i.g. Following reaction, the resulting mass was cooled to ambient temperature, the remaining pressure vented, and 2.06 mols of water were added which corresponded to 3 mols of water per mol of aluminum. The resulting reaction mass slurry consisting only of an organic phase and a solid phase was distilled and ortho-ethylaniline in a good yield was obtained from the distillation without an aqueous phase being present.

EXAMPLE X

A one liter autoclave was charged with 4 mols of aniline and 0.23 mol of aluminum flake, and the mixture was heated for catalyst preparation. After cooling and venting of the pressure within the autoclave, 3.0 mols of ethylene were added over a 45 minute period at a pressure of 980 p.s.i.g. Following heating at 330° C. for 4 hours, the resulting reaction mass was cooled, the pressure vented and 0.83 mol of water added to the reaction mass which addition corresponded to 3.62 mols of water per mol of aluminum. The resulting two phases, an organic phase and a solid phase, were subjected to vacuum distillation, and aniline, ortho-ethylaniline and 2,6-diethylaniline were obtained in good yield from the organic phase. No water was present in the product and there was no detectable decomposition of the organic reaction product.

It is apparent from the foregoing examples that considerable variation may be made in the present process without departing from the spirit and scope of the invention. An outstanding feature of this invention is that it provides a process for removing an aluminum-containing catalyst, such as aluminum triphenoxide, from a reaction mass resulting from an ortho-alkylation process without the formation of an aqueous stream contaminated with phenolic substances. Also, the removal of an aluminum anilide catalyst my be effected from a reaction mass resulting from the ortho-alkylation of aniline to produce compounds such as ortho-ethylaniline without the formation of an aqueous stream contaminated with phenolic-type compounds. Moreover, where it is desirable to remove completely the resulting hydrated aluminum hydroxides by filtration, a highly satisfactory filtering rate is obtained.

Thus, a major feature provided by the process of this invention is that the small amount of water added to a reaction mass to remove the catalyst is insufficient for the formation of a separate aqueous phase so that a slurry results comprising hydrated aluminum hydroxide, or hydrated hydroxides, suspended within a liquid organic phase. The desired ortho-alkylation products may be distilled directly from the water treated reaction mass or the solids may be removed first by centrifuging, filtration, or other physical separation means, and the ortho-alkylation products then recovered by distillation. Preferably, the solids are removed first because a cleaner separation of all the ortho-alkylated products is obtained.

Several variables are capable of affecting filtraton rate to some extent. The more important of these include filtration temperature, the amount of water added, the use of olefins and the pressure applied upon the slurry above the filter screen.

While, in general, it is preferred that a filtration temperature of from about 90° C. to about 160° C. be provided, higher temperatures can also be employed. Temperatures higher than about 160° C., however, are not desirable generally because these temperatures may tend to lessen the yield of desirable ortho-alkylation products without corresponding benefits; however, in the case of aluminum anilide catalysts which are thermally stable, it has been found that the addition of the water in accordance with the process of this invention causes them to become thermally unstable permitting the recovery of aniline from the catalyst.

While the preferred range of olefin concentration ranges as high as about 60 weight percent, based on the total weight of the reaction mass, greater concentrations of olefin may be employed. Greater amounts of olefin, however, do not necessarily increase reaction rate in direct proportion to the quantity of olefin added. Consequently, it is not necessary or desirable generally to add greater amounts of olefin.

A positive pressure applied upon the slurry is desirable to speed the rate of filtration and while any positive pressure may be employed, it is not necessary generally to provide pressures greater than about 250 pounds per square inch gauge. Pressures in the order of only 2 or 3 atmospheres may be employed with advantage.

Suitable olefins for addition to ortho-alkylation reaction masses are any of those olefins which are miscible with and non-reactive with the organic phase under treating conditions. Preferable olefins are those containing from 2 to about 8 carbon atoms in the molecule. Exemplary of these are ethylene, propylene, isobutylene, cyclohexene, styrene, and the like. Preferably the same olefin is employed in treating the reaction mass as was used in the original ortho-alkylation reaction. For example, isobutylene itself is the most preferred compound in the treating of the reaction mass from the phenolisobutylene reaction because it is easily separated from the liquid organic phase and may even be present from the original reaction.

While olefins have been described as a most desirable compound for addition to the reaction mass, other organic compounds of low viscosity may be used if inert and miscible with the liquid organic phase. Exemplary of such organic compounds are liquid aromatics containing up to about 10 carbon atoms such as benzene, xylene, cumene, nitrobenzene, monochlorotoluene, and the like and such organic compounds as liquid aliphatic hydrocarbons and mixtures thereof, having up to about 10 carbon atoms such as kerosene, petroleum ether, hexane, heptane, octane, decane, and the like.

Examples of aluminum-containing catalysts which may be found in a reaction mass and treated in accordance with this invention include such compounds as aluminum triphenoxide, aluminum diphenoxide monochloride, aluminum phenoxide dichloride, aluminum diphenoxide monohydroxide, aluminum anilides, and the like.

Having described the invention, what is claimed is:

1. In a process for the manufacture of ortho-alkylated phenols by reaction between a phenol having a position ortho to the hydroxy group available for substitution and an olefin containing from about 2 to about 8 carbon atoms selected from the group consisting of acetylene, methyl acetylene, ethyl acetylene, mono-olefins, and non-conjugated hydrocarbon olefins in the presence of an aluminum-containing catalyst selected from the group consisting of aluminum phenoxide, aluminum triphenoxide, aluminum diphenoxide monochloride, aluminum phenoxide dichloride, and aluminum anilide, a process for destroying the catalytic activity and subsequently removing said aluminum-containing catalyst as a solid phase from a resulting reaction mass comprising in combination,
   (a) contacting said resulting reaction mass with from about 1 to about 6 moles of water per mole of said aluminum-containing catalyst to form only said solid phase and an ortho-alkylated phenol containing liquid organic phase; and
   (b) recovering said liquid organic phase from said solid phase at a temperature of from about 90° C. to about 160° C. and at a pressure of from about 2 atmospheres to about 250 pounds per square inch.

2. The process of claim 1 wherein said reaction mass is contacted with from about three moles to about six moles of water per mole of aluminum-containing catalyst in said resulting reaction mass.

3. In a process for the manufacture of ortho-alkylated phenols by reaction between a phenol having a position ortho to the hydroxy group available for substitution and an olefin containing from 2 to about 8 carbon atoms selected from the group consisting of acetylene, methyl acetylene, ethyl acetylene, and mono- and non-conjugated olefins, in the presence of an aluminum-containing catalyst selected from the group consisting of aluminum phenoxide, aluminum triphenoxide, aluminum diphenoxide monochloride, aluminum phenoxide dichloride, and aluminum anilide, a process for destroying the catalytic activity and subsequently removing said aluminum-containing catalyst as a solid phase from a resulting reaction mass comprising, in combination, (a) adding sufficient organic compound selected from the group consisting of liquid aliphatic hydrocarbons containing up to about 10 carbon atoms, liquid aromatic hydrocarbons containing up to 10 carbon atoms, and mixtures thereof to said reaction mass to provide a total concentration of unreacted said olefin and said organic compound in said resulting mass of from about 5 weight percent to about 60 weight percent, based on the total weight of said resulting reaction mass;

(b) adding from about 1 to about 6 moles of water per mole of aluminum-containing catalyst to the resulting reaction mass mixture;

(c) separating the resulting slurry of only solids and oragnic liquid at a temperature of from about 90° C. to about 160° C. and at a pressure of about 2 atmospheres up to about 250 pounds per square inch; and (d) recovering said organic liquid.

4. The process of claim 3 further characterized by said total concentration being from about ten percent to about forty-five percent.

5. The process of claim 3 further characterized by said separating being direct distillation of said reaction mass after adding said water thereto.

6. The process of claim 3 wherein from about three to about six moles of water per mole of aluminum-containing catalyst in said resulting reaction mass is added to said resulting mass mixture.

7. The process of claim 1 wherein said mono-olefin is isobutylene.

References Cited
UNITED STATES PATENTS

| | | | |
|---|---|---|---|
| 2,800,514 | 7/1957 | Hathaway | 260—624 |
| 2,831,898 | 4/1958 | Ecke et al. | 260—624 |
| 3,075,832 | 1/1963 | Ecke et al. | 260—624 |
| 3,133,974 | 5/1964 | Curry | 260—624 |

BERNARD HELFIN, Primary Examiner

W. B. LONE, Assistant Examiner

U.S. Cl. X.R.

252—431; 260—619 D, 620, 575, 622 R, 571, 623 R, 625, 473 R, 578, 582, 592